United States Patent
Sumikawa

(10) Patent No.: US 10,879,690 B2
(45) Date of Patent: Dec. 29, 2020

(54) POWER GENERATOR

(71) Applicant: YAMABIKO CORPORATION, Tokyo (JP)

(72) Inventor: Taishi Sumikawa, Hiroshima (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 16/576,502

(22) Filed: Sep. 19, 2019

(65) Prior Publication Data

US 2020/0014193 A1   Jan. 9, 2020

Related U.S. Application Data

(63) Continuation of application No. PCT/JP2018/003503, filed on Feb. 2, 2018.

(30) Foreign Application Priority Data

Mar. 30, 2017   (JP) ................. 2017-067851

(51) Int. Cl.
*H02H 7/06* (2006.01)
*H02H 1/00* (2006.01)
*H02P 9/02* (2006.01)

(52) U.S. Cl.
CPC ............ *H02H 7/06* (2013.01); *H02H 1/0007* (2013.01); *H02H 1/0092* (2013.01); *H02P 9/02* (2013.01)

(58) Field of Classification Search
CPC ...... H02H 7/06; H02H 1/0007; H02H 1/0092; H02P 9/02; H02P 29/027; H02P 9/00
USPC ................................... 361/21, 24
See application file for complete search history.

(56) References Cited

U.S. PATENT DOCUMENTS

| 6,501,628 B1* | 12/2002 | Namba | H02H 7/062 |
| | | | 361/5 |
| 8,760,094 B2* | 6/2014 | Solodovnik | H02H 7/125 |
| | | | 318/400.22 |
| 9,000,611 B2* | 4/2015 | Lorenz | H02J 7/0031 |
| | | | 307/64 |

FOREIGN PATENT DOCUMENTS

JP   2008-172919 A   7/2008

OTHER PUBLICATIONS

ISR in PCT Application No. PCT/JP2018/003503 mailed Feb. 27, 2018.
Written Opinion in PCT Application No. PCT/JP2018/003503 dated Feb. 27, 2018.

* cited by examiner

*Primary Examiner* — David Luo
(74) *Attorney, Agent, or Firm* — Maschoff Brennan

(57) ABSTRACT

A power generator includes: an output information acquisition unit which acquires output information including power-generating component capacity information indicative of a capacity of a power-generating component and output frequency information indicative of an output frequency of the power generator; an ammeter which measures a current flowing through a distribution path; a breaker provided in the distribution path; and a controller. The controller calculates an allowable current based on the output information, and controls the breaker to interrupt the distribution path when a current measured by the ammeter exceeds the allowable current.

10 Claims, 7 Drawing Sheets

FIG.3

| TYPE (MODEL) | SETTING UNIT (SETTING SWITCH) | | POWER-GENERATING COMPONENT CAPACITY [kVA] | | UPPER LIMIT CURRENT [A] | | | |
| --- | --- | --- | --- | --- | --- | --- | --- | --- |
| | | | | | 50Hz | | 60Hz | |
| | S1 | S2 | 50Hz | 60Hz | 200 V CLASS | 400 V CLASS | 200 V CLASS | 400 V CLASS |
| M1 | OFF | OFF | 20 | 25 | Im11 | Im21 | Im31 | Im41 |
| M2 | OFF | ON | 37 | 45 | Im12 | Im22 | Im32 | Im42 |
| M3 | ON | OFF | 50 | 60 | Im13 | Im23 | Im33 | Im43 |
| M4 | ON | ON | 80 | 100 | Im14 | Im24 | Im34 | Im44 |

POWER GENERATOR

CROSS-REFERENCE TO RELATED APPLICATIONS

This is a continuation of International Application No. PCT/JP2018/3503 filed on Feb. 2, 2018, which claims priority to Japanese Patent Application No. 2017-067851 filed on Mar. 30, 2017. The entire disclosures of these applications are incorporated by reference herein.

TECHNICAL FIELD

The present disclosure relates to a power generator outputting electric power generated by a power-generating component.

BACKGROUND ART

Japanese Unexamined Patent Publication No. 2008-172919 discloses a power generator configured to compare a current value set in a current detection circuit including a thermal relay with a current value inputted from a current transformer, and operate a voltage trip device when the current value inputted from the current transformer exceeds the set current value.

To make such a power generator usable in different regions (e.g., different countries), the output of the power generator requires adjustment to be suitable for a rated voltage and a rated frequency in each of the regions. A breaker provided in the power generator needs to have tripping characteristics corresponding to a current value.

A conventional power generator has a current adjustment knob (a thermal relay) for tripping the breaker in a casing thereof in order to provide the breaker with the tripping characteristics corresponding to the current value described above or to use the power generator at a voltage different from the rated voltage in accordance with a change of a load or the like. The power generator is also provided with a voltage adjustment knob for adjusting an output voltage, so that the output voltage (power output) can be adjusted through manipulation of the voltage adjustment knob.

SUMMARY

However, such a conventional power generator requires the voltage adjustment knob to be manipulated, and the current adjustment knob to be re-manipulated, every time the rated voltage and/or the rated frequency changes due to a change of an installation region or the power generator is used at a voltage different from the rated voltage. This makes adjustment work very troublesome. Further, since the adjustment is manually performed, an operator may cause errors in an adjusted value of the current adjustment knob, or may omit setting or changing the value. Then, the breaker cannot have appropriate tripping characteristics. Specifically, the breaker does not trip even when overcurrent or overload occurs in the power generator, or the breaker trips at a current lower than a current that can be passed as an output current, for example.

In view of the foregoing, the present disclosure has been achieved to provide a power generator that can automatically provide a breaker with optimum tripping characteristics even in regions different in rated voltage and/or rated frequency.

A power generator according to a first aspect of the present disclosure includes: an output information acquisition unit which acquires output information including power-generating component capacity information indicative of a capacity of the power-generating component and output frequency information indicative of an output frequency of the power generator; an ammeter which measures a current flowing through a distribution path; a breaker provided in the distribution path; and a controller which calculates an allowable current that is allowed to flow through the distribution path based on the output information, and controls the breaker to interrupt the distribution path when a measured current measured by the ammeter exceeds the allowable current.

In this aspect, control is made to allow the breaker to trip in accordance with the allowable current calculated based on the output information acquired by the output information acquisition unit. Determining the allowable current based on the acquired information enables automatic calculation of the allowable current even in an environment in which the allowable current varies. This can provide the breaker with optimum tripping characteristics.

For example, the breaker can trip based on a fixed value set in advance, e.g., a fixed value set in accordance with a rated output of the power generator. However, as described above, even if the rated output is the same, the allowable current may vary depending on the rated voltage which differs by region and/or the difference in load connected to the power generator. In such a case, as described above, the breaker may fail to trip even when overcurrent and/or overload occurs in the power generator, or the breaker may trip at a current lower than a current that can flow as an output current (the allowable current). To make a single-specification power generator usable in regions different in rated voltage and/or rated frequency, a thermal relay can be used to allow the breaker to trip. However, even when the thermal relay is used, adjusting the interrupting current characteristics of the thermal relay is required region by region, which causes the problem of the adjustment work described above. The thermal relay can be used without adjusting the interrupting current characteristics. However, this brings about the problem similar to the case where the fixed value is used. In contrast, the technique according to the present aspect has no such problems.

The output information acquisition unit may further include a frequency measurement unit which acquires the output frequency information through measurement, and the controller may calculate the allowable current of the power generator based on output information including the power-generating component capacity information and the output frequency information obtained through the measurement.

The output information acquisition unit may further include a voltage measurement unit which acquires output voltage information of the power generator through measurement, and the controller calculates the allowable current based on the power-generating component capacity information, the output frequency information, and the output voltage information.

Thus, calculating the allowable current based on at least one of the output frequency information acquired through the measurement or output voltage information acquired through the measurement allows the breaker to have optimum tripping characteristics suitable for an environment in which the power generator is connected.

The controller may change the allowable current in response to a variation in the measured voltage measured by the voltage measurement unit.

With this configuration, even when the output voltage of the power generator in use varies due to, for example, a change in power consumption of a load or replacement of the connected load itself, the tripping characteristics of the breaker vary in response to the variation in the output voltage. Thus, the breaker can continuously have optimum tripping characteristics.

The controller may control the breaker to interrupt the distribution path when the measured current measured by the ammeter exceeds the upper limit current in a situation where the allowable current is larger than a predetermined upper limit current.

This configuration can enhance the protection of the power-generating component against heat.

The power generator may further include an alarm which gives an alert when a ratio of the measured current measured by the ammeter to the allowable current exceeds a predetermined ratio.

This configuration can prompt the user to take caution about the use state. In addition, this allows the user to determine whether the current usage state has a margin to the allowable current, for example.

A power generator according to a second aspect of the present disclosure includes: an output information acquisition unit which acquires output information including power-generating component capacity information indicative of a capacity of the power-generating component, and output frequency information and output voltage information of the power generator; an ammeter which measures a current flowing through a distribution path; a breaker provided in the distribution path; and a controller which identifies a rated output of the power generator based on the output information, and controls the breaker to interrupt the distribution path when a measured output calculated based on the measured current measured by the ammeter and the output voltage information exceeds the rated output.

In this aspect, similarly to the first aspect, control is made to allow the breaker to trip in accordance with the output information acquired by the output information acquisition unit. Even when the power generator is brought into an environment different in rated output, e.g., displaced to a different region, the rated output is automatically identified, and the breaker can have optimum tripping characteristics based on the rated output.

The output information acquisition unit may further include a frequency measurement unit which acquires the output frequency information through measurement, and a voltage measurement unit which acquires the output voltage information through measurement, and the controller identifies the rated output of the power generator based on output information including the power-generating component capacity information, the output frequency information obtained through the measurement, and output voltage information obtained through the measurement.

Thus, identifying the rated output in accordance with the output frequency information and output voltage information acquired through the measurement allows the breaker to have optimum tripping characteristics suitable for an environment in which the power generator is connected.

The power generator may further include an alarm which gives an alert when a ratio of the measured output to the rated output exceeds a predetermined ratio.

This configuration can prompt the user to take caution about the use state. In addition, this allows the user to determine whether the current usage state has a margin to the rated output, for example.

The power generator may be configured to be able to switch an output voltage by switching a plurality of windings between serial connection and parallel connection, an intermediate node of the plurality of windings may be provided with a switching unit which switches between the serial connection and the parallel connection, and the voltage measurement unit may measure a voltage value of the intermediate node, and acquire the output voltage information based on the voltage value of the intermediate node and a connection state of the switching unit.

This configuration can reduce the voltage to be measured by the voltage measurement unit, and thus, can reduce the withstanding voltage of the voltage measurement unit. This can simplify the configuration of the voltage measurement unit, for example, and can achieve reduction in cost and size of the voltage measurement unit.

According to the present disclosure, the allowable current is automatically calculated based on the information acquired by the output information acquisition unit, which allows the breaker to have optimum tripping characteristics suitable for a usage environment.

BRIEF DESCRIPTION OF THE DRAWINGS

FIG. 3 is a diagram illustrating an example of a table that associates output information with a rated output of the power generator.

DETAILED DESCRIPTION

An embodiment of the present disclosure will be described in detail with reference to the accompanying drawings. The following description of a preferred embodiment is merely exemplary one in nature and does not intend to limit the present disclosure, applications or use thereof.
<Configuration of Power Generator>

Figure 1:
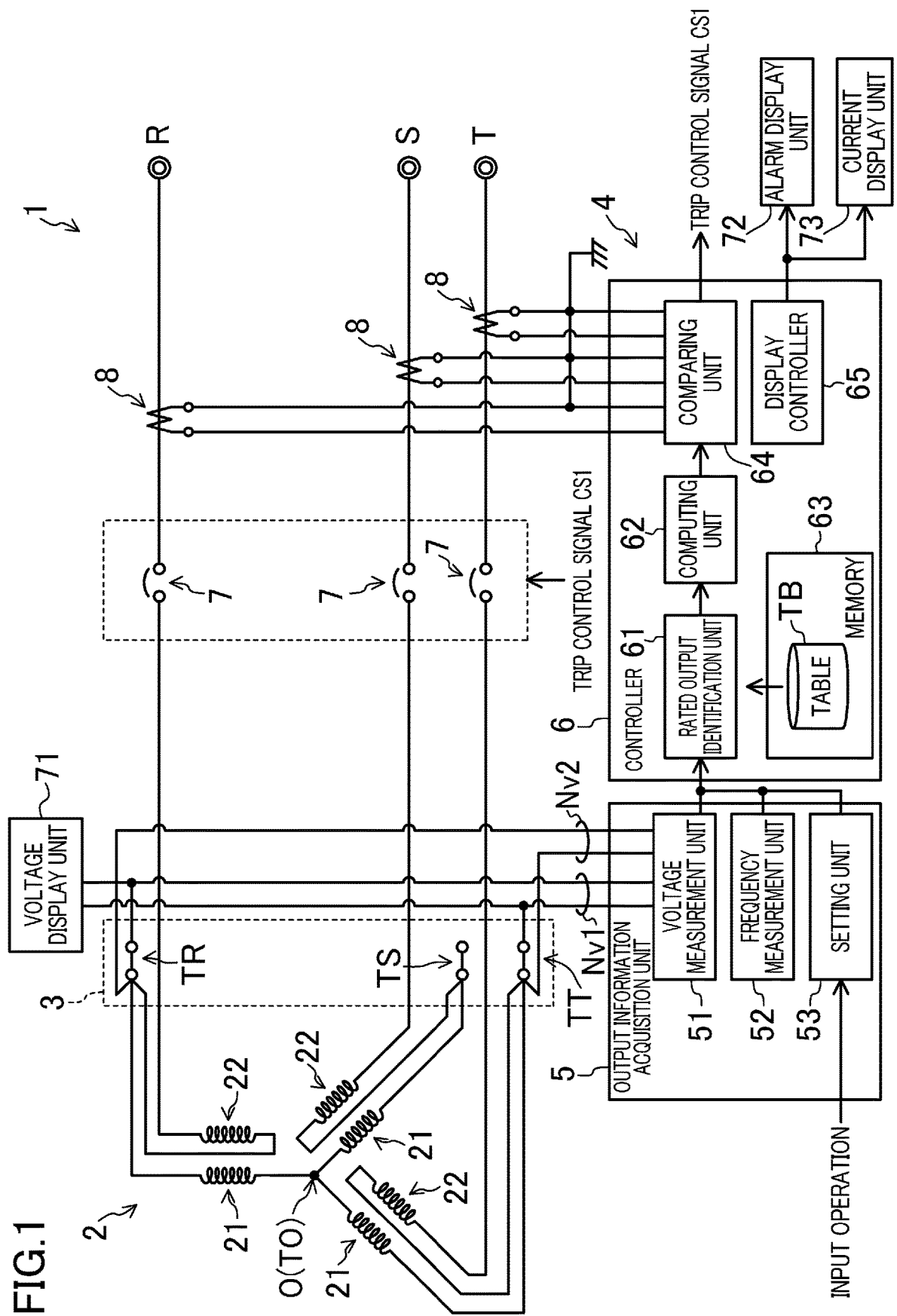
FIG. 1 is a schematic configuration diagram of a power generator according to an embodiment.
Figure 2:
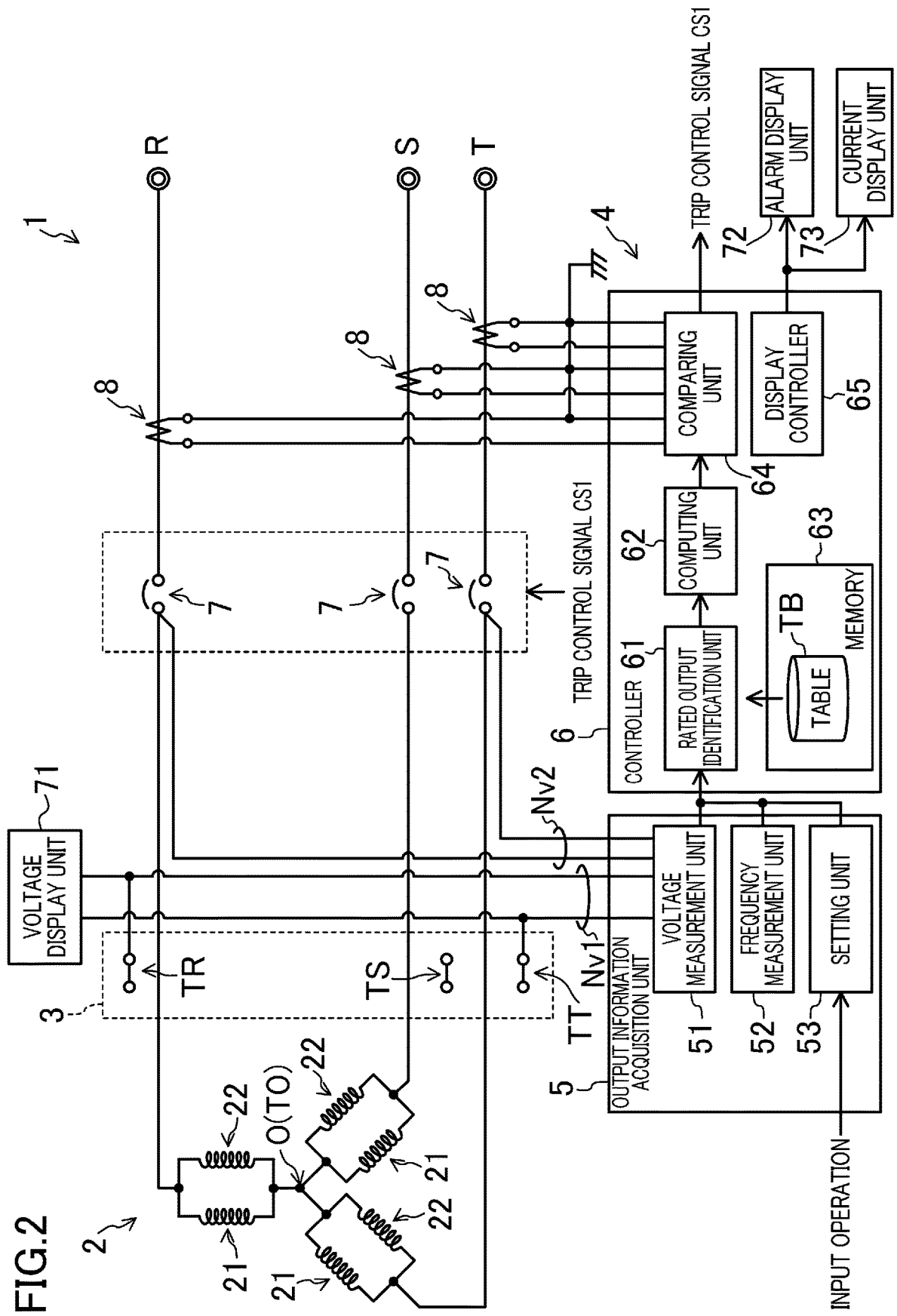
FIG. 2 is a schematic configuration diagram of a power generator according to an embodiment.

FIGS. 1 and 2 illustrate a schematic configuration of a power generator 1 according to the embodiment. The power generator 1 according to the present embodiment is configured to be able to supply three-phase AC output of a first voltage V1 (e.g., of a 400 V class) and three-phase AC output of a second voltage V2 (e.g., of a 200 V class) to three-phase output terminals R, S, and T in a switchable manner. As illustrated in FIGS. 1 and 2, the power generator 1 includes a three-phase winding 2 (e.g., an armature winding) serving as a power-generating component, an output switching unit 3 for switching the output of the three-phase winding 2, an overcurrent detection substrate 4, and a display unit. The power generator 1 further includes a voltage adjustment knob (not illustrated) as a voltage setting unit with which an operator adjusts an output voltage. The voltage adjustment knob may be a dial switch, for example, and adjusting this dial switch enables the power generator 1 to output a desired output voltage. When the power generator 1 is installed in a different region, for example, adjustment with this voltage adjustment knob may be required. The output voltage of the power generator 1 may sometimes decrease due to a load, wiring, and/or any other cause. In such a case, the voltage adjustment knob is manipulated to change the output voltage.

The overcurrent detection substrate 4 includes an output information acquisition unit 5 which acquires output information from the three-phase winding 2, and a controller 6 which controls various functions of the power generator. Further, a breaker 7, and a current transformer (CT) sensor 8 serving as an ammeter are mounted on a distribution line of each phase as a distribution path connecting the three-phase winding 2 and each of the three-phase output terminals R, S, and T. Each phase of the three-phase winding 2 includes separate first and second windings 21 and 22, which generate voltages equal to each other. The output switching unit 3 can be implemented by a terminal block, a cam switch, or a magnetic switch, for example.

FIG. 1 illustrates an example in which the three-phase winding 2 and terminals of the output switching unit 3 are connected to each other such that the first voltage V1 is output, i.e., the first and second windings 21 22 are connected in series (hereinafter referred to as a "serial connection configuration"). FIG. 2 illustrates an example in which the three-phase winding 2 and the terminals of the output switching unit 3 are connected to each other such that the second voltage V2 is output, i.e., the first and second windings 21 and 22 are connected in parallel (hereinafter referred to as a "parallel connection configuration").

—Serial Connection Configuration—

The serial connection configuration illustrated in FIG. 1 includes the first and second windings 21 and 22 of each phase connected in series between a neutral point O and an associated one of the three-phase output terminals R, S, and T. Specifically, one end of the first winding 21 of each phase is connected to a common neutral point terminal TO of the output switching unit 3, and the other end thereof is connected to an associated one of relay terminals TR, TS, and TT of the output switching unit 3. One end of the second winding 22 of each phase is connected to an associated one of the relay terminals TR, TS, and TT, and the other end thereof is connected to one of terminals of the breaker 7. The other terminal of the breaker 7 is connected to each of the output terminals R, S, and T. To make the drawing easy to see, connection between the neutral point O and the neutral point terminal TO of the output switching unit 3 is not shown. The same applies to FIG. 2. In the drawings and description of the present embodiment, a relay terminal corresponding to an R phase is denoted by TR, and similarly, relay terminals corresponding to an S phase and a T phase are denoted by TS and TT, respectively.

The output information acquisition unit 5 includes a voltage measurement unit 51, a frequency measurement unit 52, and a setting unit 53. The voltage measurement unit 51 and the frequency measurement unit 52 are connected to the relay terminals TR and TT.

The voltage measurement unit 51 acquires output voltage information and functions: (1) to determine the voltage class of the power generator 1 (see wiring Nv1); and (2) as a voltmeter measuring a voltage value (see wiring Nv2). That is to say, the output voltage information includes: (1) voltage class information of the power generator 1 (e.g., information indicating what voltage class the power generator 1 has); and (2) information on a measured value of the output voltage (a measured voltage) of the power generator 1.

The following describes (1) the acquisition of the voltage class information of the power generator 1. FIG. 1 illustrates the power generator 1 that can switch the voltage between 200 V and 400 V, in which the voltage measurement unit 51 is able to determine whether the power generator is operating at 400 V or 200 V depending on whether the voltage is present between the relay terminals TR and TT. Specifically, in the serial connection configuration, the first and second windings 21 and 22 are connected to each other via the output switching unit 3, which generates a voltage between the relay terminals TR and TT. In contrast, in the parallel connection configuration, the first and second windings 21 and 22 are not connected to the relay terminals TR and TT, and no voltage is generated between the relay terminals TR and TT.

The following describes (2) the acquisition of the measured voltage of the power generator 1. In FIG. 1, the wiring Nv2 used as the voltmeter is connected to the relay terminals TR and TT. That is, the voltage measurement unit 51 measures the voltage between the relay terminals TR and TT. The voltage measurement unit 51 calculates the output voltage of the power generator 1 based on a voltage value between the relay terminals TR and TT and the voltage class information of the power generator 1. The voltage value thus calculated will be referred to as a measured voltage of the power generator 1. In the serial connection configuration (400 V) illustrated in FIG. 1, for example, the relay terminals TR and TT are connected to the midpoint between the first and second windings 21 and 22, and the voltage value measured by the voltage measurement unit 51 is doubled to be the measured voltage of the power generator 1, which is outputted to a rated output identification unit 61. Using such a measurement method can reduce the withstanding voltage of the voltmeter, and can reduce the size and costs of the voltmeter. The rated output identification unit 61 may receive only the voltage class information of the power generator 1 and the measured value of the voltage between the relay terminals TR and TT from the voltage measurement unit 51, and calculate the measured voltage of the power generator 1 based on the received information.

The frequency measurement unit 52 measures an output frequency of the power generator 1 based on an input voltage from the relay terminals TR and TT. The output frequency of the power generator 1, which varies by region, is generally 50 Hz or 60 Hz. Consequently, the frequency measurement unit 52 determines at which frequency of 50 Hz or 60 Hz the power generator is driven, for example, as frequency information of the power generator 1. When the power generator 1 uses an engine, the frequency may be converted into the number of revolutions to be measured (determined). The value measured as the output frequency will be referred to as a measured frequency of the power generator 1.

The voltage inputted to the voltage measurement unit 51 and the frequency measurement unit 52 is not limited to the voltage between TR and TT. For example, an input voltage inputted to at least one of the voltage measurement unit 51 or the frequency measurement unit 52 may be a voltage between TR and TS or a voltage between TS and TT in place of the voltage between TR and TT. The voltage measurement unit 51 may monitor all the line voltages among TR, TS, and TT, or average the line voltages among TR, TS, and TT to be the measured voltage, for example. A phase voltage between the neutral point O and each phase may be used as the measured voltage. The same applies to a position and method of measurement by the frequency measurement unit 52.

The setting unit 53 is able to set a type of the power generator 1. The type of the power generator 1 designates, for example, a model classified by the magnitude of the capacity of the three-phase winding 2 (hereinafter referred to as a power-generating component capacity), and is identified at the manufacture of the power generator 1. The output information acquisition unit 5 acquires the power-generating component capacity information, which is the information on the power-generating component capacity, from the type of the power generator 1 set in the setting unit 53. The setting unit 53 may be configured to enable a user to enter information, and may be comprised of a switch, for example. This configuration allows the same overcurrent detection substrate 4 to be used in power generators 1 different in the power-generating component capacity.

FIG. 3 illustrates an example in which two ON/OFF switches (e.g., dip switches) serving as the setting units 53 enable four power generators of different power-generating component capacities to use the same overcurrent detection substrate 4. In FIG. 3, when both of the setting units 53 are set to "OFF," for example, the power generator 1 can be identified to have a rated output of 20/25 [kVA] as the power-generating component capacity information. The setting unit 53 may be omitted when the overcurrent detection substrate 4 is dedicated for a power generator with a specific rated output, for example. The power-generating component capacity information may be stored in advance as factory default settings in a memory 63 of the controller 6, and the setting unit 53 may be omitted.

The controller 6 monitors whether the overcurrent or the overload has occurred or not. The controller 6 is able to give an alert and/or output a trip control signal CS1 to allow the breaker 7 to trip when at least one of a predetermined overcurrent condition or a predetermined overload condition is satisfied. Specifically, the controller 6 includes the rated output identification unit 61, a computing unit 62 performing various kinds of computations such as a calculation of the allowable current, the memory 63 storing therein a table TB as illustrated in FIG. 3, a comparing unit 64, and a display controller 65. The controller 6 can be implemented by a microcomputer having a built-in or external memory, for example. Although the present embodiment describes the controller 6 divided into blocks for the sake of easy description, the configuration of the controller 6 is not limited to this example. For example, the functions of the blocks may be integrated together or classified in a manner different from FIG. 1 as long as the controller 6 is able to implement similar functions as the controller 6.

The rated output identification unit 61 has the function of identifying the rated output based on the output information acquired by the output information acquisition unit 5. For example, the rated output identification unit 61 compares a set value set by the setting unit 53, the measured frequency measured by the frequency measurement unit 52, and the class information determined by the voltage measurement unit 51 in the output information acquisition unit 5 with the table TB of the memory 63 to identify the rated output of the power generator 1. Specifically, in FIG. 3, for example, when the setting units are set to "OFF," the frequency is 50 [Hz], and the voltage class information is 400 V, the rated output identification unit 61 identifies the power generator 1 as having a rated output of 20 [kVA] and an upper limit current of Im21 [A].

The computing unit 62 calculates the allowable current based on the rated output identified by the rated output identification unit 61 and the measured voltage measured by the voltage measurement unit 51.

The comparing unit 64 compares a predetermined reference value with at least one of a measured current detected by the CT sensor 8 or a measured output calculated by the formula "the measured current×the measured voltage>√3".

In accordance with the comparison result, the comparing unit 64 displays an alarm display unit 72 (e.g., an alarm lamp 72) via the display controller 65, and/or outputs the trip control signal CS1 to trip the breaker 7. The reference numeral 71 denotes a voltage display unit capable of displaying the measured voltage, and the reference numeral 73 denotes a current display unit capable of displaying a current of a selected phase. The display unit may be configured to display specific voltage values, and/or an indicator lamp which is turned on/off in different manners in accordance with the voltage class (200 V/400 V).

—Parallel Connection Configuration—

The parallel connection configuration illustrated in FIG. 2 will be described in detail below. The parallel connection configuration is basically the same as the serial connection configuration shown in FIG. 1. Thus, the following description will be focused on only differences from the serial connection configuration, and the description of the same or similar components may sometimes be omitted.

In the parallel connection configuration, the three-phase winding 2 includes the first and second windings 21 and 22 connected in parallel between the neutral point O and each of the three-phase output terminals R, S, and T. Specifically, one end of each of the first and second windings 21 and 22 for each phase is connected to the common neutral point terminal TO of the output switching unit 3, and the other end thereof is connected to a distribution line as a distribution path connected to an associated one of the output terminals R, S, and T. In the parallel connection configuration, both of the first and second windings 21 and 22 are not connected to the relay terminals TR and TT.

Regarding "(2) the acquisition of the output voltage value of the power generator," the voltage measurement unit 51 in the configuration of FIG. 2 measures a voltage between terminals, toward the three-phase winding 2, of the breaker 7 connected to the R and T phases. The "(2) acquisition of the voltage class information of the power generator" described above is implemented by a configuration similar to that of FIG. 1, and no voltage is generated between the relay terminals TR and TT. Consequently, the voltage measurement unit 51 outputs the voltage measured between the terminals of the breaker 7 toward the three-phase winding 2 to the rated output identification unit 61 as the measured voltage of the power generator 1.

<Tripping of Breaker of Power Generator>

Figure 4:
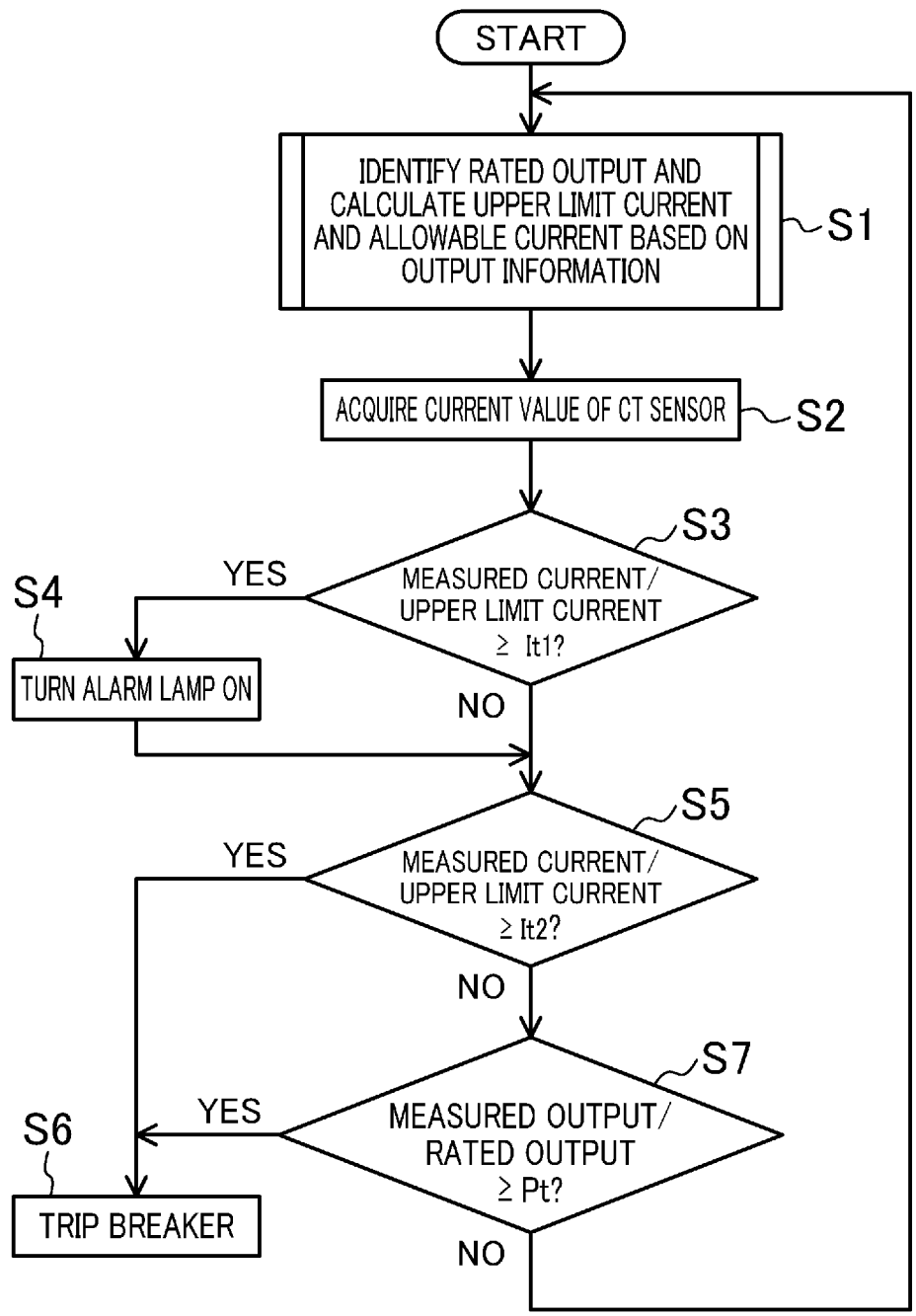
FIG. 4 is a flowchart illustrating how a breaker trips.
Figure 5:
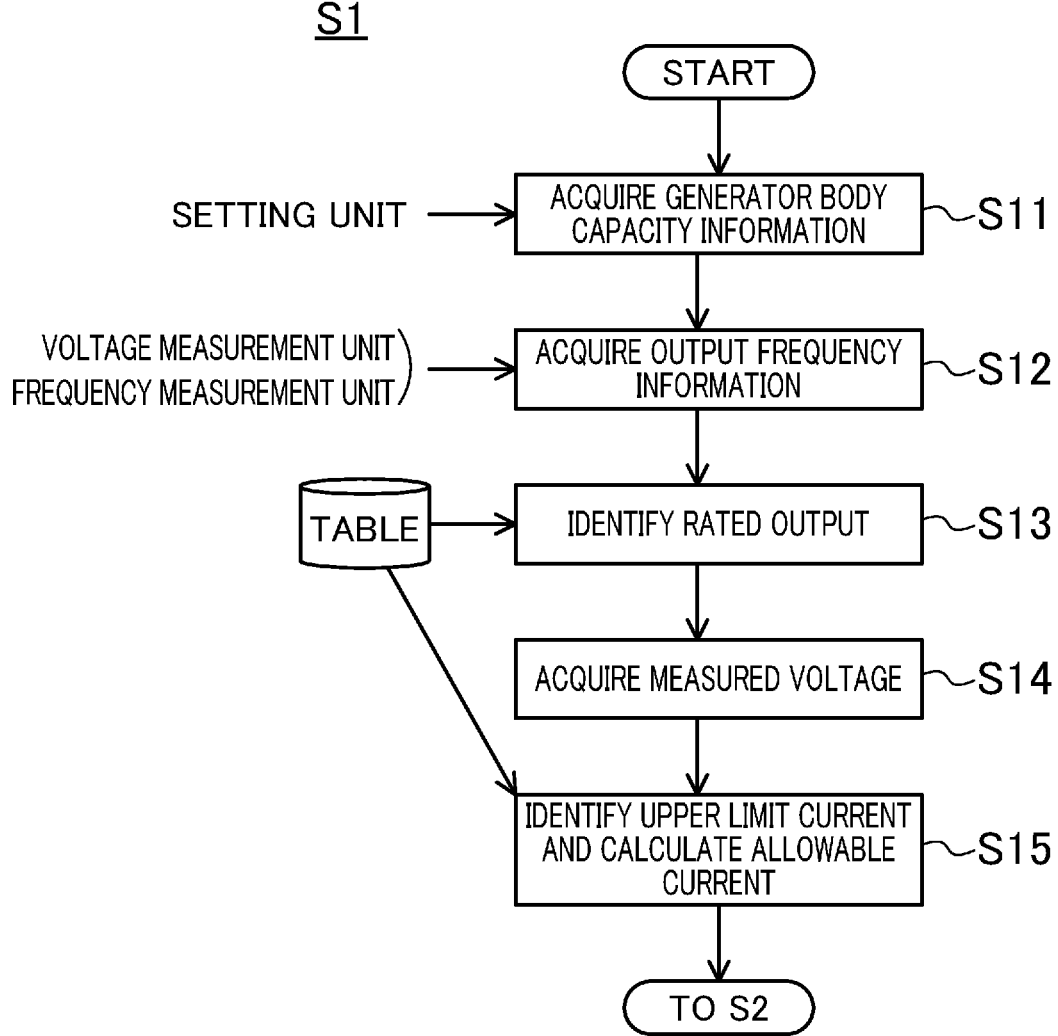
FIG. 5 is a flowchart illustrating identification of a rated output and an upper limit current and calculation of an allowable current.

The following describes in detail how the breaker 7 trips when overcurrent or overload occurs in the power generator 1 with reference to FIG. 4 and FIG. 5. The output voltage of the power generator is assumed to be adjusted to a desired output voltage by the voltage setting unit. Specifically, the output voltage is assumed to be adjusted to, for example, a rated voltage corresponding to a region in which the power generator 1 is installed.

First, in Step S1, the controller 6 identifies the rated output and the upper limit current and calculates the allowable current, based on the output information acquired by the output information acquisition unit 5.

—Identification of Rated Output and Upper Limit Current and Calculation of Allowable Current—

The following specifically describes how the rated output and the upper limit current are identified and how the allowable current is calculated with reference to FIG. 5.

First, in Step S11, the output information acquisition unit 5 acquires the power-generating component capacity information set in the setting unit 53. Specifically, the output information acquisition unit 5 reads the set value set in the setting unit 53. In Step S12, the output information acquisition unit 5 acquires the measured frequency from the frequency measurement unit 52.

In Step S13, the rated output identification unit 61 identifies the rated output based on the set value (the power-generating component capacity information) of the setting unit 53 and the measured frequency that have been received. When both of the switches of the setting unit 53 are "OFF" and the frequency is 50 Hz, for example, the rated output is 20 [kVA].

Figure 6:
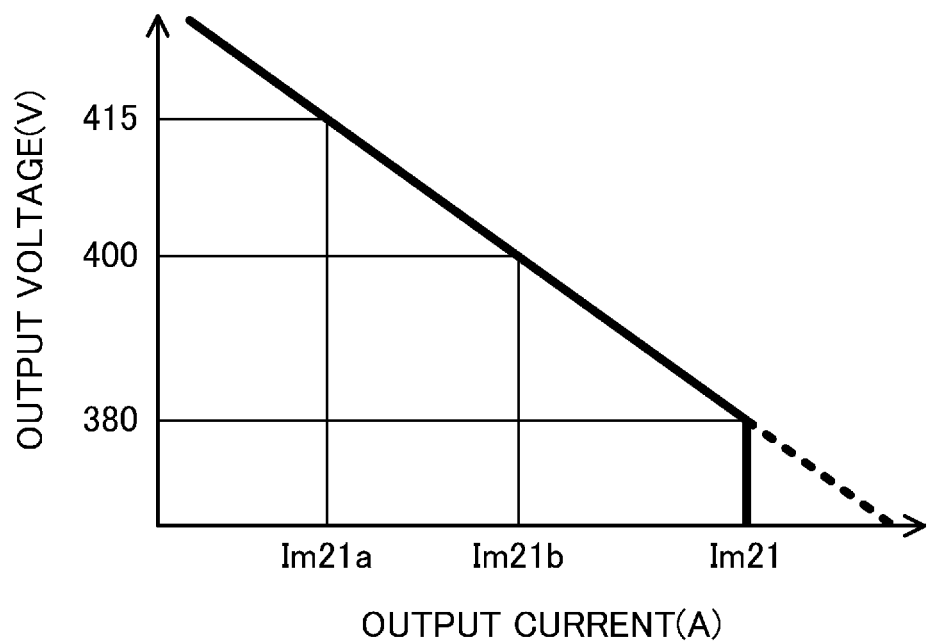
FIG. 6 is a diagram illustrating tripping characteristics of the breaker.

Next, the rated output identification unit 61 refers to the table TB checks the voltage class information of the power generator 1 acquired by the voltage measurement unit 51 in Step S14 and the rated output identified in Step S13 against the table TB to identify the upper limit current. When the rated output is 20 [kVA] and the voltage class of the power generator 1 is 400 V, for example, the rated output identification unit 61 identifies the upper limit current as Im21 [A]. The computing unit 62 acquires the measured voltage of the power generator 1 from the voltage measurement unit 51, and calculates the allowable current which is allowable as an output current of the power generator 1 based on the measured voltage and the rated output. The allowable current can be calculated using, for example, an expression of linear approximation as illustrated by a thick line in FIG. 6. is stored in the memory 63. The computing unit 62 repeats the computation during the operation of the power generator 1, and the allowable current is updated every predetermined period or in real time in response to a change in the measured voltage. Specifically, as illustrated in FIG. 6, when the measured voltage is 415 [V], the allowable current is set to Im21a [A]. Similarly, when the measured voltage is 400 [V], the allowable current is set to Im21b [A], and when the measured voltage is 380 [V], the allowable current is set to Im21 [A]. Even when the measured voltage is 380 [V] or less, the allowable current does not exceed the upper limit current Im21 [A].

Referring back to FIG. 4, in Step S2, the comparing unit 64 acquires a current value of the CT sensor 8. As the current value of the CT sensor 8, in view of the degree of necessity of protection from malfunction, the largest current value among the R, S, and T phases is employed, for example. However, the currents of all phases may be monitored, or the currents of the phases may be averaged to obtain a measured value. Then in Step S3, the comparing unit 64 determines whether the ratio of the measured current measured by the CT sensor 8 to the upper limit current identified by the rated output identification unit 61 does not exceed a predetermined ratio It1. If the ratio exceeds the predetermined ratio (Yes is selected in Step S3), the alarm lamp (the alarm display unit) 72 is turned on in Step S4, and the flow proceeds to Step S5. If the ratio does not exceed the predetermined ratio (No is selected in Step S3), the flow proceeds to Step S5. The ratio It1 is a value less than one, for example, and principally intends to notify the user of the measured current value approaching the upper limit value through the lighting of the alarm lamp 72. Unlike a thermal relay, the determination technique according to the present disclosure does not depend on the current and temperature, and thus, is able to make a determination for the alert and a determination related to the interruption of the current more accurately.

After the determination whether the ratio of the measured current to the upper limit current does not exceed the predetermined ratio It1 in Step S3, or in place of Step S3, whether the alert is necessary or not may be determined based on the rated output and the measured output. For example, when the ratio of the measured output (the measured current×the measured voltage×√3) to the rated output identified in Step S13 exceeds a predetermined ratio Ptx, the alarm lamp 72 may be turned on.

Next in Step S5, the comparing unit 64 determines whether the ratio of the measured current measured by the CT sensor 8 to the upper limit current does not exceed a predetermined ratio It2 (It2>It1). If the ratio exceeds the predetermined ratio (Yes is selected in Step S5), the comparing unit 64 outputs the trip control signal CS1 to trip the breaker 7 (Step S6). In contrast, if the ratio does not exceed the predetermined ratio It2 (No is selected in Step S5), the flow proceeds to Step S7. In Step S6, the comparing unit 64 may cause the breaker 7 to trip at the moment when the ratio of the measured current to the upper limit current has exceeded the predetermined ratio It2, or may cause the breaker 7 to trip after a period corresponding to the ratio of excess (a load factor) has passed. The same applies to the case in which the breaker 7 trips through a transition from Step S7 described below to Step S6.

In Step S7, the comparing unit 64 determines whether the ratio of the measured output to the rated output identified in Step S13 does not exceed a predetermined ratio Pt (Pt>Ptx). If the ratio exceeds the predetermined ratio Pt (Yes is selected in Step S7), the comparing unit 64 outputs the trip control signal CS1 to cause the breaker 7 to trip (Step S6). In contrast, if the ratio does not exceed the predetermined ratio Pt (No in Step S7), the process returns to S1.

According to the embodiment described above, the allowable current that can flow as the output current can be calculated or the rated output can be identified based on the output information acquired by the output information acquisition unit 5 even if the power generator is installed in a different region where the rated voltage and the rated frequency are different from the current region, and the breaker can trip based on these values. This enables the power generator 1 according to the present embodiment to automatically set appropriate tripping characteristics in response to the rated voltage and/or the rated frequency that varies region by region. Further, even in an environment in which the measured voltage varies, appropriate tripping characteristics can be automatically set.

For example, the breaker 7 can trip based on a fixed value (e.g., a fixed current value) set in advance. However, when the current value is fixed, the output may vary in response to the variations in the rated voltage of a load. Variations in the load may change the output voltage. In such cases, when the breaker is configured to trip based on the fixed value as described above, overload may occur, or the breaker may trip at a current lower than the allowable current. However, the technique of the present embodiment can prevent such problems.

The output frequency information of the power generator and the voltage class information of the power generator can be identified through the measurement. This can improve user's convenience, and can avoid mistakes or omission in settings.

As described above, to make a single-specification power generator usable in regions different in rated voltage and/or rated frequency, a thermal relay can be used to allow the breaker to trip. In this case, an interrupting current of the thermal relay requires adjustment based on the rated voltage and the rated frequency in a region where the power generator is used. Further, when the output of the power generator 1 varies through the user's adjustment of the output voltage in in response to the load, the interrupting current of the thermal relay requires adjustment.

Figure 7:
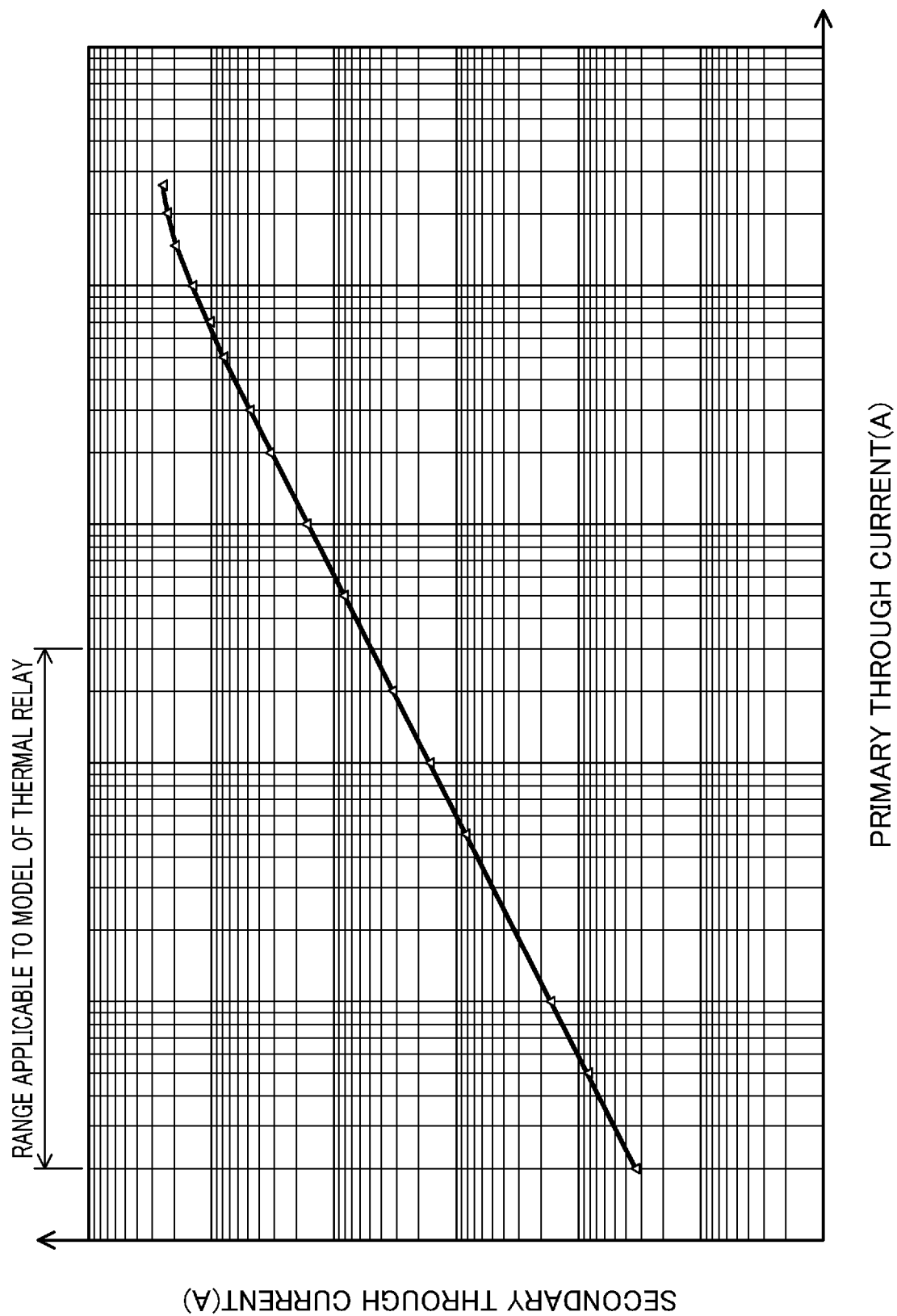
FIG. 7 is a diagram of an example of output characteristics of a current detection circuit.

In contrast, the power generator 1 according to the present embodiment calculates the allowable current that can flow as the output current based on the output information acquired by the output information acquisition unit 5, and allows the breaker 7 to trip based on the allowable current. Thus, no thermal relay is required, and adjustment of the interrupting current is unnecessary. Since the thermal relay is no longer necessary, the trip of the breaker is not affected by the temperature of the internal elements and the temperature of the casing. For example, the thermal relay is brought into a so-called cold start situation in which the trip delays when internal elements are low in temperature at the start of the operation. Then, when energized continuously, the thermal relay is brought into a so-called hot start situation in which the trip is advanced. The power generator of the present embodiment has no such problems. Further, the CT sensor can be downsized, and the whole measurement range of the CT sensor can be used (see the solid line in FIG. 7). Specifically, use of the thermal relay requires a current appropriate for the model of the thermal relay to be obtained from the CT sensor. Then as illustrated in FIG. 7, for example, the usable measurement range of the CT sensor is limited by the model of the thermal relay. Further, the CT sensor bears driving of a heater element and ammeter within the thermal relay, and a large rated burden is required, which increases the size of the CT. In contrast, the power generator of the present embodiment has no such a problem.

Further, in the present embodiment, as illustrated in FIG. 4, the measured current is compared with the upper limit current, and then the measured output is compared with the rated output. Thus, determination is performed stepwise. Specifically, (1) whether the overcurrent has occurred in the power generator 1 or not is determined through comparison between the currents, thereby thermally protecting the three-phase winding 2 (the power-generating component), and then, (2) whether the overload has occurred in the power generator 1 or not is determined through comparison between the outputs. This determination can reliably protect the power generator 1. Specifically, in the comparison between the measured output and the rated output, when the trip of the breaker is necessary or not is determined based on the expression "the measured current×the measured voltage×√3," the allowable current increases with the decrease in the measured current. Given this situation, the upper limit current described above is set to prevent the power-generating component from being excessively heated. For example, when the power generator 1 drives a submerged pump (not illustrated), the output voltage may decrease at the startup of the pump. The power generator 1 of the present disclosure is particularly effective in such a situation.

The embodiment and modifications thereof have just been described as examples of the technique disclosed in the present application. However, the present disclosure is not limited to those exemplary embodiments, but is also applicable to other embodiments which are altered or substituted as needed. The components described in the above embodiment can be combined to provide a new embodiment.

Other Embodiments

In the embodiment described above, the output frequency information is acquired through the measurement by the frequency measurement unit 52, but this is not limiting. For example, a frequency setting unit (not illustrated) such as a dip switch may be provided for the setting unit. In this case, the rated output identification unit 61 acquires a set value of the frequency setting unit in place of the frequency measured by the frequency measurement unit 52 to identify the rated output.

The output voltage information is acquired through the measurement by the voltage measurement unit, but this is not limiting. For example, a set value of the voltage setting unit may be acquired. Specifically, the computing unit 62 acquires the set value of the voltage setting unit in place of the voltage measured by the voltage measurement unit 51, and identifies the upper limit current and calculates the allowable current based on this set value and the rated output identified by the rated output identification unit 61. For a power generator corresponding to a fixed value output only, such as an output at the rated voltage only, the fixed value can be used as the output voltage information. However, using the measured voltage is advantageous because optimum operation which is more suitable for an actual usage environment can be achieved as described above.

The present disclosure can advantageously provide a power generator that can automatically provide a breaker with optimum tripping characteristics even in regions different in rated voltage and/or rated frequency.

What is claimed is:

1. A power generator outputting electric power generated by a power-generating component, the power generator comprising:
an output information acquisition unit which acquires output information including power-generating component capacity information indicative of a capacity of the power-generating component and output frequency information of the power generator, the output information acquisition unit including a frequency measurement unit which acquires the output frequency information through measurement;
an ammeter which measures a current flowing through a distribution path; and
a breaker provided in the distribution path, wherein
the power generator further comprises a controller which calculates an allowable current that is allowed to flow through the distribution path based on the output information including the power-generating component capacity information and the output frequency information obtained through the measurement of the frequency measurement unit, the controller controlling the breaker to interrupt the distribution path when a measured current measured by the ammeter exceeds the allowable current.

2. The power generator of claim 1, wherein
the controller controls the breaker to interrupt the distribution path when the measured current measured by the ammeter exceeds the upper limit current in a situation where the allowable current is larger than a predetermined upper limit current.

3. The power generator of claim 1, further comprising
an alarm which gives an alert when a ratio of the measured current measured by the ammeter to the allowable current exceeds a predetermined ratio.

4. A power generator outputting electric power generated by a power-generating component, the power generator comprising:
an output information acquisition unit which has a voltage measurement unit acquiring output voltage information of the power generator through measurement, the output information acquisition unit acquiring power-generating component capacity information indicative of a capacity of the power-generating component;

an ammeter which measures a current flowing through a distribution path;

a breaker provided in the distribution path; and a controller which calculates an allowable current that is allowed to flow through the distribution path based on the power-generating component capacity information and the output voltage information measured by the voltage measurement unit, the controller controlling the breaker to interrupt the distribution path when a measured current measured by the ammeter exceeds the allowable current.

5. The power generator of claim 4, wherein
the controller changes the allowable current in response to a variation in the measured voltage measured by the voltage measurement unit.

6. The power generator of claim 4, wherein
the power generator is configured to be able to switch an output voltage by switching a plurality of windings between serial connection and parallel connection,
an intermediate node of the plurality of windings is provided with a switching unit which switches between the serial connection and the parallel connection, and
the voltage measurement unit measures a voltage value of the intermediate node, and acquires the output voltage information based on the voltage value of the intermediate node and a connection state of the switching unit.

7. The power generator of claim 4, wherein
the controller controls the breaker to interrupt the distribution path when the measured current measured by the ammeter exceeds the upper limit current in a situation where the allowable current is larger than a predetermined upper limit current.

8. The power generator of claim 4, further comprising
an alarm which gives an alert when a ratio of the measured current measured by the ammeter to the allowable current exceeds a predetermined ratio.

9. A power generator outputting electric power generated by a power-generating component, the power generator comprising:

an output information acquisition unit which acquires output information including power-generating component capacity information indicative of a capacity of the power-generating component, and output frequency information and output voltage information of the power generator, the output information acquisition unit including a frequency measurement unit which acquires the output frequency information through measurement, and a voltage measurement unit which acquires the output voltage information through measurement;

an ammeter which measures a current flowing through a distribution path;

a breaker provided in the distribution path; and a controller which identifies a rated output of the power generator based on the output information including the power-generating component capacity information, the output frequency information measured by the frequency measurement unit, and the output voltage information measured by the voltage measurement unit, the controller controlling the breaker to interrupt the distribution path when a measured output calculated based on the measured current measured by the ammeter and the output voltage information exceeds the rated output.

10. The power generator of claim 9, further comprising:
an alarm which gives an alert when a ratio of the measured output to the rated output exceeds a predetermined ratio.

* * * * *